E. G. HELANDER.
CONDENSER.
APPLICATION FILED APR. 19, 1910.

1,068,430. Patented July 29, 1913.

WITNESSES

INVENTOR
E. G. Helander,
by Bakewell Byrnes Parmelee,
his Attys.

UNITED STATES PATENT OFFICE.

ERNST G. HELANDER, OF PITTSBURGH, PENNSYLVANIA, ASSIGNOR OF ONE-HALF TO AXEL H. HELANDER, OF YOUNGSTOWN, OHIO.

CONDENSER.

1,068,430.  Specification of Letters Patent.  Patented July 29, 1913.

Application filed April 19, 1910. Serial No. 556,392.

*To all whom it may concern:*

Be it known that I, ERNST G. HELANDER, a resident of Pittsburgh, in the county of Allegheny and State of Pennsylvania, have invented a new and useful Improvement in Condensers, of which the following is a full, clear, and exact description, reference being had to the accompanying drawings, forming part of this specification, in which—

Figure 1:
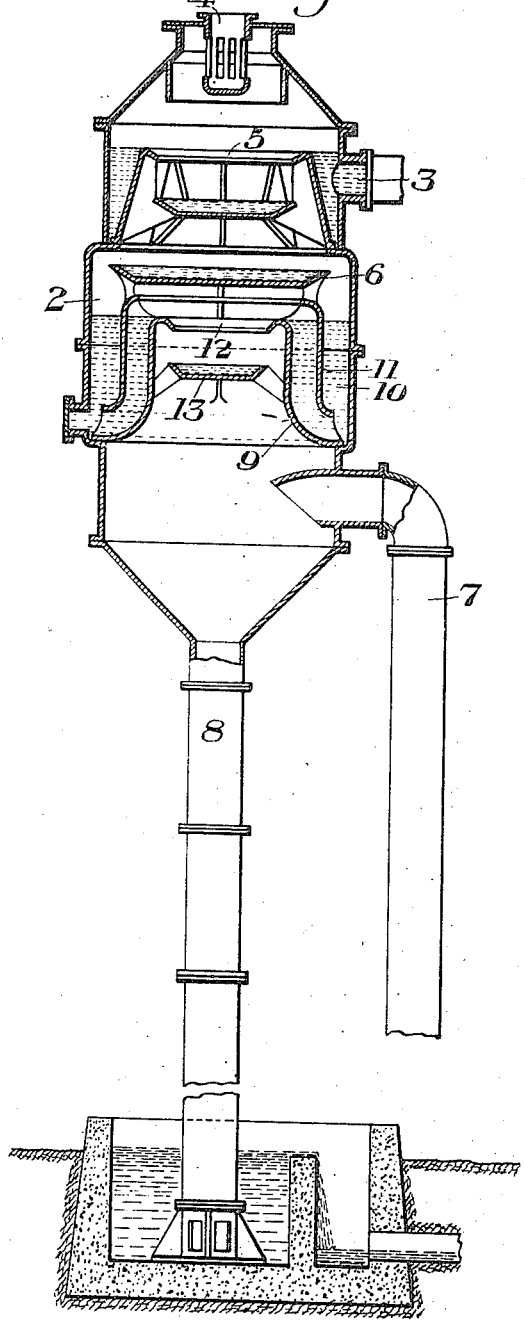
Figure 2:
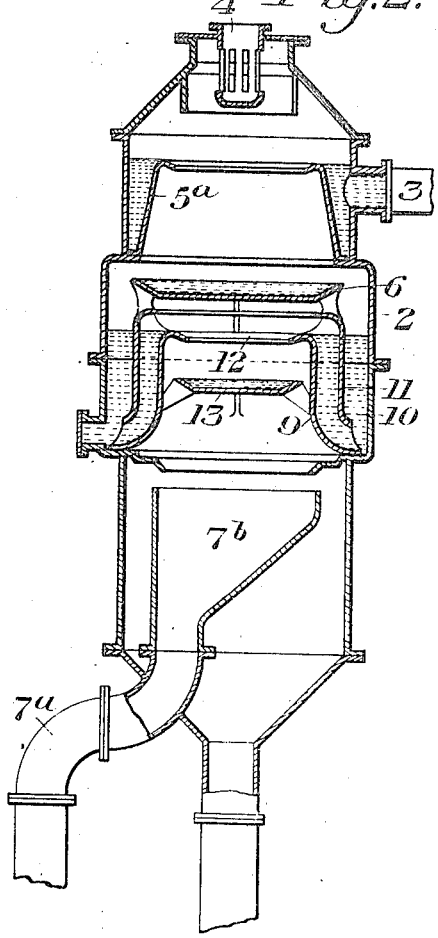

Figure 1 is a sectional elevation of a barometric condenser embodying my invention, and Fig. 2 is a similar view of a portion of a modified condenser also embodying my invention.

My invention has relation to condensers, and is designed to provide the condensing chamber with a water reservoir of sufficient capacity to keep the outgoing cooling water of a nearly constant temperature, this reservoir providing means for taking care of fluctuations in the amount of steam passing through the condenser and preventing overheating of the cooling water.

Referring first to Fig. 1, the numeral 2 designates the condensing chamber, having an inlet opening at 3 for connection with the usual water supply pipe, and an opening 4 at its upper end for connection with the usual exhaust or vacuum pipe. 5 and 6 designate interior cones, cups, or baffles, which are arranged to produce a spraying action of the water discharged into the chamber at the opening 3. Any suitable arrangement of these baffles may be used. The water entering at the opening 3 flows over the upper end of the upper cone or baffle 5, thence downwardly into the cup below the top opening in the cone or baffle 5 and thence over the edges of said cup into the cup of the lower baffle 6. 7 designates the steam inlet pipe which enters the lower portion of the condensing chamber 2, and 8 is the usual tail pipe. Placed in the condensing chamber, below the cup or baffle 6, is a centrally arranged upwardly extending annular baffle 9, which is separated from the outer wall of the chamber 2 by a water space 10 into which extends a depending annular baffle 11, whose lower edge terminates a short distance above the lower edge of the baffle 9. The water flowing over the upper edge of the cup thus flows downwardly into the space or chamber 10 outside of the baffle 11 and thence upwardly between the baffle 11 and the central baffle 9, and thence downwardly over the inturned edge 12 of the lower baffle and into the lower chamber 9. Another cup or baffle 13 may be placed below the inturned edge 12 of the baffle 9. The space or chamber 10 is of a capacity such as will enable it to retain at all times a considerable body of water, this body being of sufficient volume to take care of the fluctuations in the action of the condenser without becoming unduly heated.

It will be understood the condenser is of the well known counter-current type in which the steam flows upwardly against the down flowing spray or shower of water.

In Fig. 2 I have shown my invention applied to a barometric condenser of the peculiar type of my Patent No. 926,486 of June 29, 1909, in which the steam inlet pipe $7^a$ extends vertically upward through the bottom wall of the condensing chamber at one side of the tail pipe, its upper end $7^b$ terminating within the condensing chamber. This form of the invention is otherwise the same as that shown in Fig. 1, except that I have omitted the lower cup of the upper baffle $5^a$.

As above stated, any suitable arrangement of baffles may be provided within the upper portion of the condensing chamber for producing the proper spray or shower of water, my invention residing solely in the provision within the condensing chamber of a reservoir of water, as described.

What I claim is:

A condenser of the countercurrent type, having a water inlet at its upper portion and a steam inlet at its lower portion, and at its intermediate portion having two concentric cylindrical baffles, the inner baffle surrounding a steam and water passage and having a water overflow at its upper edge, and the outer baffle being separated from the inner baffle and from the wall of the condenser by water spaces, said outer baffle extending above the upper edge of the inner baffle and having a central opening, and there being an opening below the lower edge of the outer baffle, together with a water distributing cup within the inner baffle and another distributing cup located above the upper end of the outer baffle; substantially as described.

In testimony whereof, I have hereunto set my hand.

E. G. HELANDER.

Witnesses:
 Geo. B. Bleming,
 Geo. H. Parmelee.